(12) United States Patent
Hozumi et al.

(10) Patent No.: US 9,250,575 B2
(45) Date of Patent: Feb. 2, 2016

(54) BELT ASSEMBLY AND IMAGE FORMING APPARATUS INCLUDING SAME

(71) Applicants: Yoshiki Hozumi, Kanagawa (JP); Naomi Sugimoto, Kanagawa (JP); Naoki Iwaya, Tokyo (JP); Yasufumi Takahashi, Kanagawa (JP); Masaharu Furuya, Kanagawa (JP); Kazuchika Saeki, Kanagawa (JP)

(72) Inventors: Yoshiki Hozumi, Kanagawa (JP); Naomi Sugimoto, Kanagawa (JP); Naoki Iwaya, Tokyo (JP); Yasufumi Takahashi, Kanagawa (JP); Masaharu Furuya, Kanagawa (JP); Kazuchika Saeki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/524,077

(22) Filed: Oct. 27, 2014

(65) Prior Publication Data

US 2015/0125189 A1    May 7, 2015

(30) Foreign Application Priority Data

Nov. 7, 2013    (JP) .................................. 2013-231311

(51) Int. Cl.
  *G03G 15/16*   (2006.01)
  *F16H 7/20*    (2006.01)
  *F16H 7/14*    (2006.01)
  (Continued)

(52) U.S. Cl.
  CPC ............ *G03G 15/1605* (2013.01); *B65H 5/025* (2013.01); *F16H 7/14* (2013.01); *F16H 7/20* (2013.01); *G03G 15/1615* (2013.01); *F16H 2007/0865* (2013.01); *F16H 2007/0891* (2013.01)

(58) Field of Classification Search
  CPC ......... G03G 15/1605; F16H 7/20; F16H 7/14; B65H 5/20
  See application file for complete search history.

(56) References Cited

U.S. PATENT DOCUMENTS

| 4,432,632 | A | * | 2/1984 | Yokota ........................... 399/113 |
| RE37,157  | E | * | 5/2001 | Ikeda et al. .................... 399/124 |
| 7,751,750 | B2 | * | 7/2010 | Shoji .............................. 399/121 |

(Continued)

FOREIGN PATENT DOCUMENTS

| JP | 2006-267243 | 10/2006 |
| JP | 2008-026453 | 2/2008 |

(Continued)

OTHER PUBLICATIONS

U.S. Appl. No. 14/488,644, filed Sep. 17, 2014, Naoki Iwaya, et al.

(Continued)

*Primary Examiner* — G. M. Hyder
(74) *Attorney, Agent, or Firm* — Oblon, McClelland, Maier & Neustadt, L.L.P (57) ABSTRACT

A belt assembly includes a belt, a plurality of support rollers, and a shaft-end retainer. The belt is formed into an endless loop, entrained about and stretched taut between the plurality of support rollers with a rotary shaft. The plurality of support rollers includes a first support roller and a second support roller. The shaft-end retainer including a first retainer and a second retainer is disposed at each end of the rotary shaft of the plurality of support rollers. The first retainer detachably holds an end of the rotary shaft of the first support roller. The second retainer detachably holds an end of the rotary shaft of the second support roller and includes a second-retainer opening from which the end of the rotary shaft of the second roller is detachable from and attachable to the second retainer in a direction perpendicular to the rotary shaft of the second support roller.

5 Claims, 7 Drawing Sheets

(51) Int. Cl.
*B65H 5/02* (2006.01)
*F16H 7/08* (2006.01)

(56) References Cited

U.S. PATENT DOCUMENTS

| | | | |
|---|---|---|---|
| 2002/0021916 A1* | 2/2002 | Wakana | 399/121 |
| 2005/0139456 A1* | 6/2005 | Kitamura | 198/860.1 |
| 2006/0119029 A1* | 6/2006 | Kitamura | 271/275 |
| 2007/0009310 A1* | 1/2007 | Kato | 400/691 |
| 2007/0110471 A1* | 5/2007 | Kitamura | 399/101 |
| 2008/0107449 A1* | 5/2008 | Oohara | 399/167 |
| 2009/0062048 A1* | 3/2009 | Nakura | 474/135 |
| 2013/0108319 A1* | 5/2013 | Shishikura | 399/121 |
| 2013/0192959 A1* | 8/2013 | Kitamura | 198/806 |
| 2013/0306440 A1 | 11/2013 | Asaoka et al. | |
| 2013/0306441 A1 | 11/2013 | Asaoka et al. | |
| 2014/0008184 A1 | 1/2014 | Hozumi et al. | |
| 2014/0083821 A1 | 3/2014 | Hozumi et al. | |
| 2014/0183007 A1 | 7/2014 | Hozumi et al. | |
| 2014/0209437 A1 | 7/2014 | Hozumi et al. | |
| 2015/0090564 A1* | 4/2015 | Iwaya et al. | 198/835 |
| 2015/0117914 A1* | 4/2015 | Hozumi et al. | 399/312 |

FOREIGN PATENT DOCUMENTS

| | | |
|---|---|---|
| JP | 2010-230958 | 10/2010 |
| JP | 2012-103286 | 5/2012 |

OTHER PUBLICATIONS

U.S. Appl. No. 14/507,087, filed Oct. 6, 2014, Yoshiki Hozumi, et al.

* cited by examiner

IMMEDIATELY AFTER ASSEMBLY

FIG. 3

AFTER ADJUSTMENT

BELT ASSEMBLY AND IMAGE FORMING APPARATUS INCLUDING SAME

CROSS-REFERENCE TO RELATED APPLICATIONS

This patent application is based on and claims priority pursuant to 35 U.S.C. §119 to Japanese Patent Application No. 2013-231311, filed on Nov. 7, 2013, in the Japan Patent Office, the entire disclosure of which is hereby incorporated by reference herein.

BACKGROUND

1. Technical Field

Exemplary aspects of the present invention generally relate to a belt assembly including an endless looped belt entrained about a plurality of rollers and an image forming apparatus, such as a copier, a facsimile machine, or a printer including the belt conveyor unit.

2. Description of the Related Art

In known image forming apparatuses, an image bearing member such as a latent image bearing member and an intermediate transfer member for carrying an image and a conveyor system for carrying a sheet-type medium employ an endless looped belt. A belt assembly including such an endless looped belt also includes a plurality of support rollers, and the belt is entrained about and stretched taut at a certain tension between the plurality of support rollers. The plurality of support rollers is arranged at predetermined shaft intervals. Normally, one of support rollers constitutes a drive roller to rotate the belt. In many cases, one of support rollers constitutes a tension roller biased against the belt by a biasing device, thereby applying a desired tension to the belt.

After extended use, the belt deteriorates gradually due to wear and tear, and contamination, and loses its intended function eventually. As a result, after a predetermined time period, the belt needs to be replaced with a new belt as needed. Because other parts constituting the belt assembly such as the plurality of support rollers, a shaft retainer to hold end portions of rotary shafts of the support rollers have often not reached the end of their product life cycles by the time the belt needs to be replaced, the belt needs to be detached from the belt assembly and then the new belt is mounted.

When replacing the belt with the new one, the tension of the belt is loosened so that the belt is detached from the support rollers. More specifically, the rotary shaft of one of the support rollers about which the belt is entrained is moved to loosen the belt tension, thereby allowing the belt to be detached from the support rollers.

For example, the distance between the shafts of two support rollers is shortened so that the tension of the belt is loosened and detached from the support rollers. In this configuration, a device to change the position of the support rollers is necessary, resulting in an increase in the number of parts and the cost and hindering efforts to make the belt assembly compact.

In view of the above, there is demand for a belt assembly capable of easy installation and detachment of the belt without increasing the number of parts, and image forming apparatus including such a belt assembly.

SUMMARY

In view of the foregoing, in an aspect of this disclosure, there is provided an improved belt assembly including a belt, a plurality of support rollers, and a shaft-end retainer. The belt is formed into an endless loop. The belt is entrained about and stretched taut between the plurality of support rollers with a rotary shaft. The plurality of support rollers includes a first support roller and a second support roller. The shaft-end retainer is disposed at each end of the rotary shaft of the plurality of support rollers and includes a first retainer and a second retainer. The first retainer detachably holds an end of the rotary shaft of the first support roller. The second retainer detachably holds an end of the rotary shaft of the second support roller and includes a second-retainer opening from which the end of the rotary shaft of the second support roller is detached from and attached to the second retainer in a direction perpendicular to the rotary shaft of the second support roller.

According to another aspect, an image forming apparatus includes a belt assembly. The belt assembly includes a belt, a plurality of support rollers, and a shaft-end retainer. The belt is formed into an endless loop. The belt is entrained about and stretched taut between the plurality of support rollers with a rotary shaft. The plurality of support rollers includes a first support roller and a second support roller. The shaft-end retainer is disposed at each end of the rotary shaft of the plurality of support rollers and includes a first retainer and a second retainer. The first retainer detachably holds an end of the rotary shaft of the first support roller. The second retainer detachably holds an end of the rotary shaft of the second support roller and includes a second-retainer opening from which the end of the rotary shaft of the second roller is detached from and attached to the second retainer in a direction perpendicular to the rotary shaft of the second support roller.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

Figure 1:
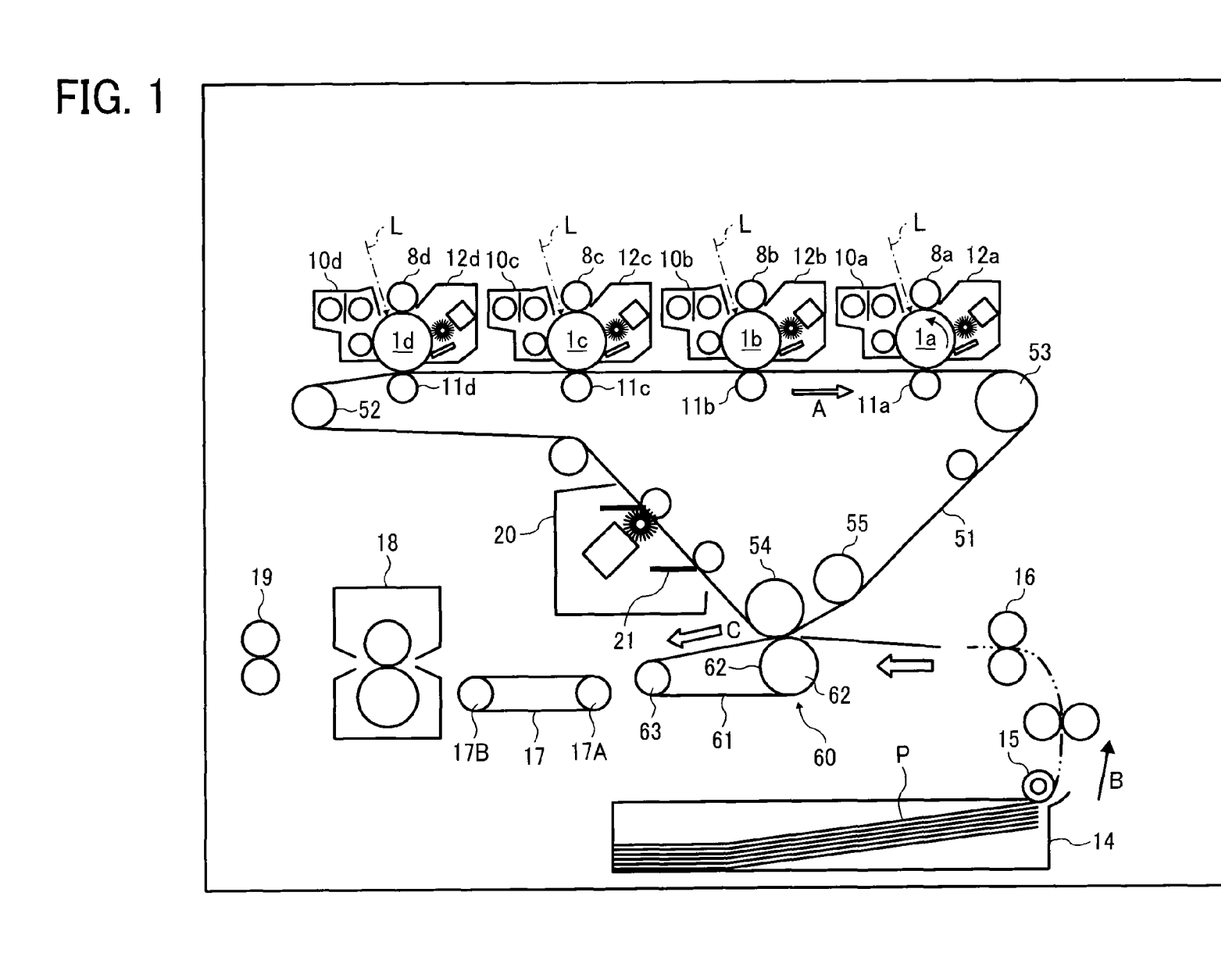
FIG. 1 is a schematic diagram illustrating a printer as an example of an image forming apparatus.

FIG. 1 is a schematic diagram illustrating a printer as an example of an image forming apparatus of the present disclosure.

The image forming apparatus includes four photosensitive members 1a, 1b, 1c, and 1d disposed inside a main body housing of the image forming apparatus. Toner images of different colors are formed on the respective photosensitive members 1a, 1b, 1c, and 1d. More specifically, a black toner image, a magenta toner image, a cyan toner image, and a yellow toner image are formed on the photosensitive members 1a, 1b, 1c, and 1d, respectively. According to the present illustrative embodiment, the photosensitive members 1a, 1b, 1c, and 1d have a drum shape. Alternatively, the photosensitive members 1a, 1b, 1c, and 1d may employ an endless looped belt entrained about a plurality of rollers and driven to rotate.

The image forming apparatus includes an intermediate transfer belt 51 formed into an endless loop as an intermediate transfer member which serves as an image bearing member. The intermediate transfer belt 51 faces the four photosensitive members 1a, 1b, 1c, and 1d. The outer circumferential surface of each of the photosensitive members 1a, 1b, 1c, and 1d contacts the outer circumferential surface of the intermediate transfer belt 51. The intermediate transfer belt 51 is entrained about and stretched taut between a plurality of support rollers: a tension roller 52, a drive roller 53, a repulsive roller 54, an entry roller 55, and so forth. The drive roller 53, which is one of support rollers, is driven to rotate by a drive source, and rotation of the drive roller 53 enables the intermediate transfer belt 51 to travel in a direction of hollow arrow A in FIG. 1.

The intermediate transfer belt 51 may be a single-layer belt or a multi-layer belt. In the case of the multi-layer belt, a base layer of the belt may be formed of a relatively inelastic fluorine resin such as a polyvinylidene fluoride (PVDF) sheet and polyimide resin, with a smooth coating layer of fluorine resin deposited on the outer surface of the belt. In the case of a single-layer belt, the belt material may be selected from, for example, polyvinylidene difluoride (PVDF), polycarbonate (PC), and polyimide (PI).

The configuration and operation for forming toner images on each of the photosensitive drums 1a, 1b, 1c, and 1d, all have a similar or the same configuration as all the others, differing only in the color of toner employed. Similarly, the configuration and operation for transferring primarily the toner images onto the intermediate transfer belt 51 have a similar or the same configuration as all the others, differing only the color of toner employed. Thus, a description is provided only of the photosensitive member 1a for forming a black toner image and its associated imaging equipment as an example of the photosensitive members and associated imaging equipment. The description of the photosensitive members 1b, 1c, and 1d, and associated imaging equipment are omitted herein, unless otherwise indicated.

The outer circumferential surface of the photosensitive member 1a is illuminated with light from a discharging device, thereby initializing the surface potential of the photosensitive member 1a. The initialized surface of the photosensitive member 1a is charged uniformly by a charging device 8a to a predetermined polarity (in the present illustrative embodiment, a negative polarity). Similarly, the initialized photosensitive members 1b, 1 c, and 1d are charged uniformly by charging devices 8b, 8c, and 8d. Subsequently, an exposure device illuminates the charged surface of the photosensitive member 1a with a modulated laser beam L, thereby forming an electrostatic latent image on the surface of the photosensitive member 1a.

According to the present illustrative embodiment, the exposure device that projects the laser beam L includes a laser writing device. Alternatively, the exposure device may include an LED array and an imaging device. The electrostatic latent image formed on the photosensitive member 1a is developed with a respective color of toner, i.e., black, by a development device 10a into a visible image, known as a black toner image. Reference numerals 10b, 10c, and 10d also refer to development devices.

Primary transfer rollers 11a, 11b, 11c, and 11d serving as primary transfer devices are disposed inside the looped intermediate transfer belt 51, facing the photosensitive members 1a, 1b, 1c, and 1d, respectively. The primary transfer roller 11a, hereinafter described as a representative example of the primary transfer rollers, contacts the inner circumferential surface of the intermediate transfer belt 51 to form a primary transfer nip between the photosensitive member 1a and the intermediate transfer belt 51. The primary transfer roller 11a is supplied with a primary transfer voltage having a polarity (in the present illustrative embodiment, a positive polarity) opposite a charge polarity of the toner image formed on the photosensitive member 1a, thereby forming a primary transfer electric field between the photosensitive member 1a and the intermediate transfer belt 51 and transferring electrostatically the toner image onto the intermediate transfer belt 51. After the toner image is primarily transferred onto the intermediate transfer belt 51, residual toner remaining on surface of the photosensitive member 1a is removed by a cleaning device 12a. Similarly, the photosensitive members 1b, 1c, and 1d are cleaned by cleaning devices 12b, 12c, and 12d, respectively.

In a full-color mode in which toner images of four different colors are formed, similar to the black toner image, a magenta toner image, a cyan toner image, and an yellow toner image are formed on the photosensitive members 1b, 1c, and 1d, respectively. As described above, the toner images in the colors magenta, cyan, and yellow are transferred onto the intermediate transfer belt 51, such that they are superimposed one atop the other on the black toner image which has been primarily transferred onto the intermediate transfer belt 51.

When forming a single color image of black color, such as in a monochrome mode, the primary transfer rollers 11b, 11c, and 11d, other than the primary transfer roller 11a for black, are separated from the photosensitive members 1b, 1c, and 1d for the colors magenta, cyan, and yellow by a moving device. In a state in which only the photosensitive member 1a is in contact with the intermediate transfer belt 51, only the black toner image is transferred primarily onto the intermediate transfer belt 51.

As illustrated in FIG. 1, a paper feed device 14 is disposed substantially at the bottom of the main body of the image forming apparatus. The paper feed device 14 includes a feed roller 15 to pick up and send a recording medium P as a sheet-type medium in a direction indicated by an arrow B in FIG. 1. The recording medium P fed by the feed roller 15 is delivered in a predetermined timing to a secondary transfer nip at which the intermediate transfer belt 51 entrained about the repulsive roller 54 contacts a secondary transfer belt 61 of a secondary transfer device 60. The recording medium P is sent to the secondary transfer nip in appropriate timing by a pair of registration rollers 16. At this time, the repulsive roller 54 is supplied with a predetermined secondary transfer voltage to transfer secondarily the toner image from the intermediate transfer belt 51 onto the recording medium P.

The secondary transfer belt 61 formed into an endless loop is entrained about and stretched taut between a separation roller 63 and secondary transfer roller 62. The separation roller 63 serves as a first support rotary member and also as a tiltable rotary member. The secondary transfer roller 62 serves as a second support roller. According to the present illustrative embodiment, rotation of the secondary transfer roller 62 as a drive roller enables the secondary transfer belt 61 to travel in a direction indicated by a hollow arrow C in FIG. 1. The recording medium P, onto which the toner image is secondarily transferred, is carried on the outer circumferential surface of the secondary transfer belt 61 and transported while the recording medium P is absorbed electrostatically to the outer circumferential surface of the secondary transfer belt 61. Subsequently, the recording medium P separates from the surface of the secondary transfer belt 61 at the curved portion of the secondary transfer belt 61 entrained about the separation roller 63, and is transported further downstream from the secondary transfer belt 61 in a transport direction of the recording medium P by a conveyor belt 17 disposed downstream from the secondary transfer belt 61.

The conveyor belt 17 is entrained about and stretched taut between a first roller 17A and a second roller 17B. The first roller 17A serves as a drive roller and as an entry roller. The second roller 17B serves as a driven roller. When the recording medium P passes through a fixing device 18 which applies heat and pressure to the toner image on the recording medium P, the toner image is fixed to the recording medium P. After the recording medium P passes through the fixing device 18, the recording medium P is discharged outside the main body through a pair of output rollers 19 of a discharge unit.

Residual toner remaining on the intermediate transfer belt 51 after the toner image is secondarily transferred therefrom is removed by a belt cleaning device 20. In the present illustrative embodiment, the belt cleaning device 20 includes a cleaning blade 21 made of suitable material, such as urethane, held against the intermediate transfer belt 51 to mechanically remove or scrape toner residues from the belt surface. Alternatively, instead of or in combination with a cleaning blade, any suitable cleaning device may be used to clean the intermediate transfer belt 51, including, for example, an electrostatic cleaning device for electrostatically removing toner residues from the belt surface.

Next, a description is provided of a belt alignment device employed in the secondary transfer device 60 equipped with the secondary transfer belt 61.

According to the present illustrative embodiment, the belt alignment device employed in the secondary transfer device 60 is of a shaft-inclining type, and a shaft moving device 70 serves as the belt alignment device of the secondary transfer device 60 to tilt a rotary shaft 63a of the separation roller 63 about which the secondary transfer belt 61 is entrained so as to restrict the range of misalignment of the secondary transfer belt 61 within a predetermined permissible range. The separation roller 63 is one of support rollers about which the secondary transfer belt 61 is entrained.

Figure 2:
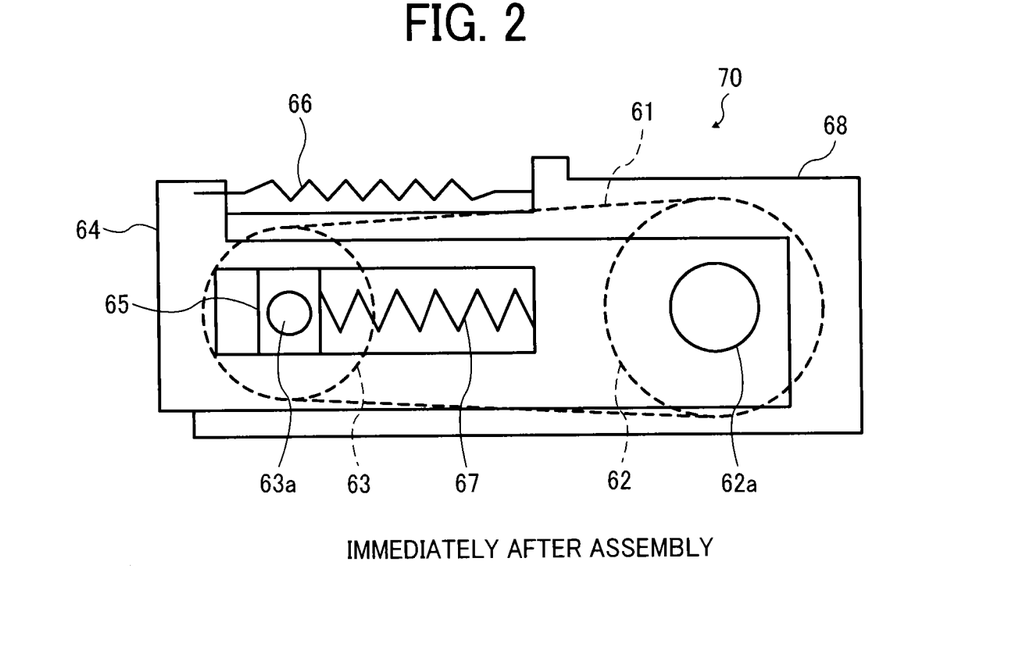
FIG. 2 is a schematic diagram illustrating a shaft moving device of a secondary transfer device employed in the image forming apparatus of FIG. 1 immediately after assembly as viewed in an axial direction of a separation roller.

FIG. 2 is a schematic diagram illustrating the shaft moving device 70 immediately after assembly, as viewed in an axial direction of the separation roller 63.

Figure 3:
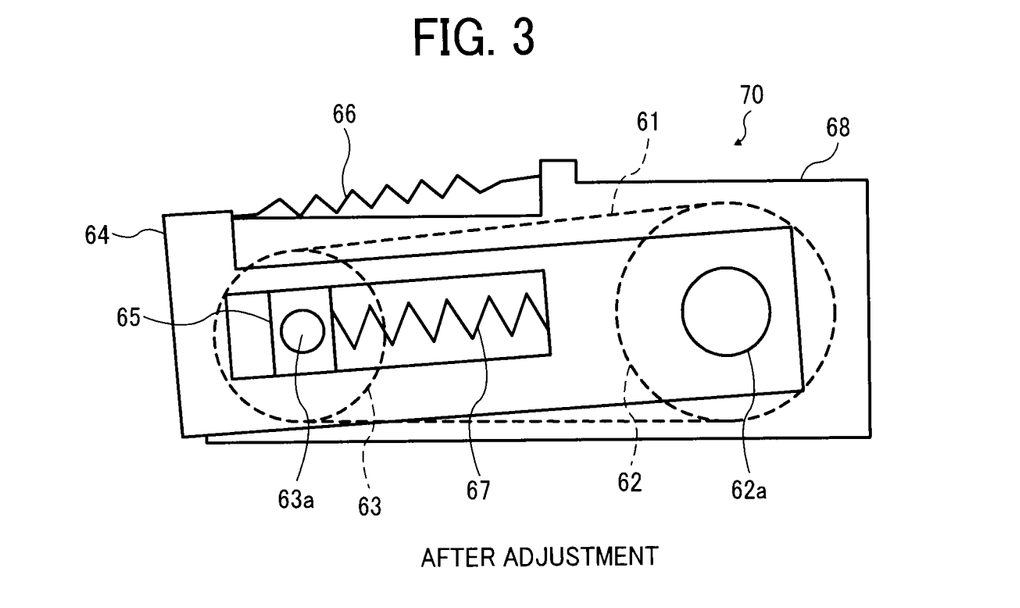
FIG. 3 is a schematic diagram illustrating the shaft moving device after adjustment of belt mistracking as viewed in the axial direction of the separation roller.

FIG. 3 is a schematic diagram illustrating the shaft moving device 70 after adjustment of misalignment of the secondary transfer belt 61, as viewed in the axial direction of the separation roller 63.

According to the present illustrative embodiment, a shaft bearing is attached to each end of the rotary shaft of the secondary transfer roller 62. The secondary transfer device 60 includes two frames (also referred to as a shaft-end retainer) 68 disposed at both ends of the secondary transfer roller 62 in the axial direction thereof. Each shaft bearing of the secondary transfer roller 62 is held by each frame 68. Accordingly, the secondary transfer roller 62 is rotatably supported by the frames 68.

Each of two shaft support arms 64 is disposed outside each of the frames 68 in the axial direction. Each end of the rotary shaft 63a of the separation roller 63 is attached to a slidable shaft bearing 65 held by each shaft support arm 64. Accordingly, the separation roller 63 is rotatably supported by the shaft support arm 64.

Each shaft support arm 64 is rotatably attached to each end of a rotary shaft 62a of the secondary transfer roller 62 and biased in a clockwise direction in FIG. 2 by an arm spring 66 with one end thereof fixed to the frame 68 of the secondary transfer device 60. In a state in which there is no misalignment of the secondary transfer belt 61 immediately after assembly, a rotation position of the shaft support arms 64 is maintained at a position at which the shaft support arms 64 contact the frames 68 due to a bias force of the arm spring 66 as illustrated in FIG. 2.

As illustrated in FIGS. 2 and 3, each shaft support arm 64 slidably supports the slidable shaft bearing 65 that bears the rotary shaft 63a of the separation roller 63 such that the slidable shaft bearing 65 can slide in a radial direction from the center of rotation of the shaft support arm 64. The slidable shaft bearing 65 is biased by a tension spring 67 in the radial direction from the center of rotation of the shaft support arms 64 towards outside. With this configuration, the separation roller 63 is always biased in such a direction that the separation roller 63 separates from the secondary transfer roller 62. Accordingly, a certain tension is applied to the secondary transfer belt 61 entrained around the separation roller 63 and the secondary transfer roller 62.

Figure 4:
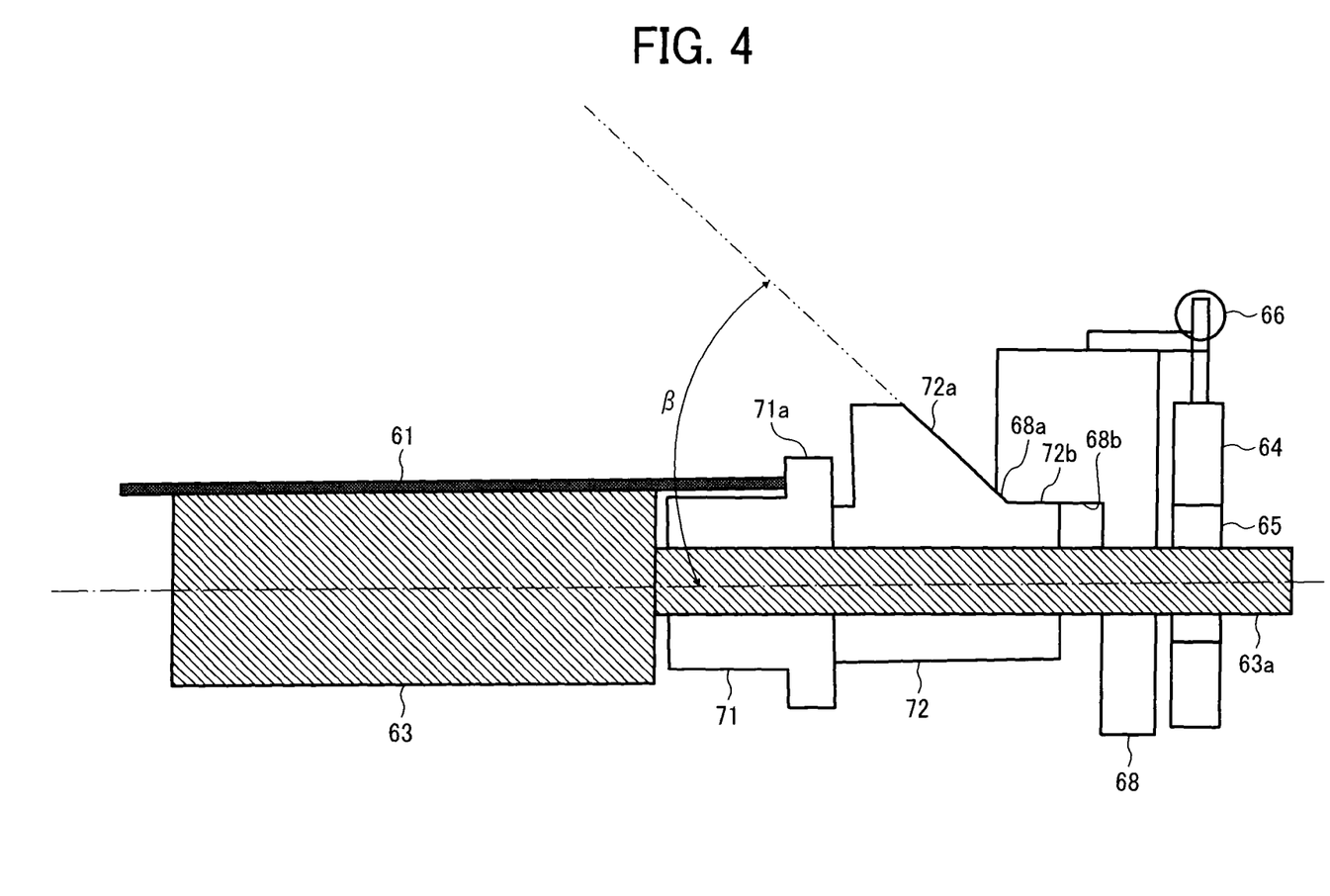
FIG. 4 is a cross-sectional diagram schematically illustrating the shaft moving device immediately after assembly, taken along a rotary shaft of the separation roller.

FIG. 4 is a cross-sectional diagram schematically illustrating the shaft moving device 70 of the secondary transfer device 60, cut along the rotary shaft 63a of the separation roller 63.

A belt deviation detector 71 and a shaft inclining member 72 are disposed on the rotary shaft 63a between the separation roller 63 and the slidable shaft bearing 65. The belt deviation detector 71 and the shaft inclining member 72 constitute an axial displacement device. The belt deviation detector 71 includes a flange 71a that contacts an end portion of the secondary transfer belt 61. As the secondary transfer belt 61 moves in the direction of the belt width, and the end portion thereof contacts the flange 71a, exerting a force on the belt deviation detector 71, the belt deviation detector 71 moves outward in the axial direction along the rotary shaft 63a of the separation roller 63. As the belt deviation detector 71 moves outward in the axial direction along the rotary shaft 63a, the shaft inclining member 72 which is disposed outside the belt deviation detector 71 on the rotary shaft 63a moves outward in the axial direction along the rotary shaft 63a.

A contact portion 68a of the frame 68 serving as a fixation member contacts a slanted surface 72a of the shaft inclining member 72 from outside the rotary shaft 63a in the axial direction. The end portion of the rotary shaft 63a of the separation roller 63 on which the shaft inclining member 72 is disposed is supported, via the shaft bearing 65, by the shaft support arm 64 which is biased by the arm spring 66. Thus, the end portion of the rotary shaft 63a is biased upward in FIG. 4. Accordingly, in a state in which the end portion of the secondary transfer belt 61 is not in contact with the flange 71a of the belt deviation detector 71, the contact position at which the contact portion 68a of the frame 68 and the slanted surface 72a of the shaft inclining member 72 contact is restricted to a position at which a first stopper surface 68b of the frame 68 contacts a contact surface 72b of the shaft inclining member 72 due to the spring force of the arm spring 66. The contact surface 72b of the shaft inclining member 72 is continuously formed at the lower end of the slanted surface 72a. That is, the contact portion 68a of the frame 68 is held in a state in which the contact portion 68a contacts the lower end portion of the slanted surface 72a of the shaft inclining member 72.

Figure 5:
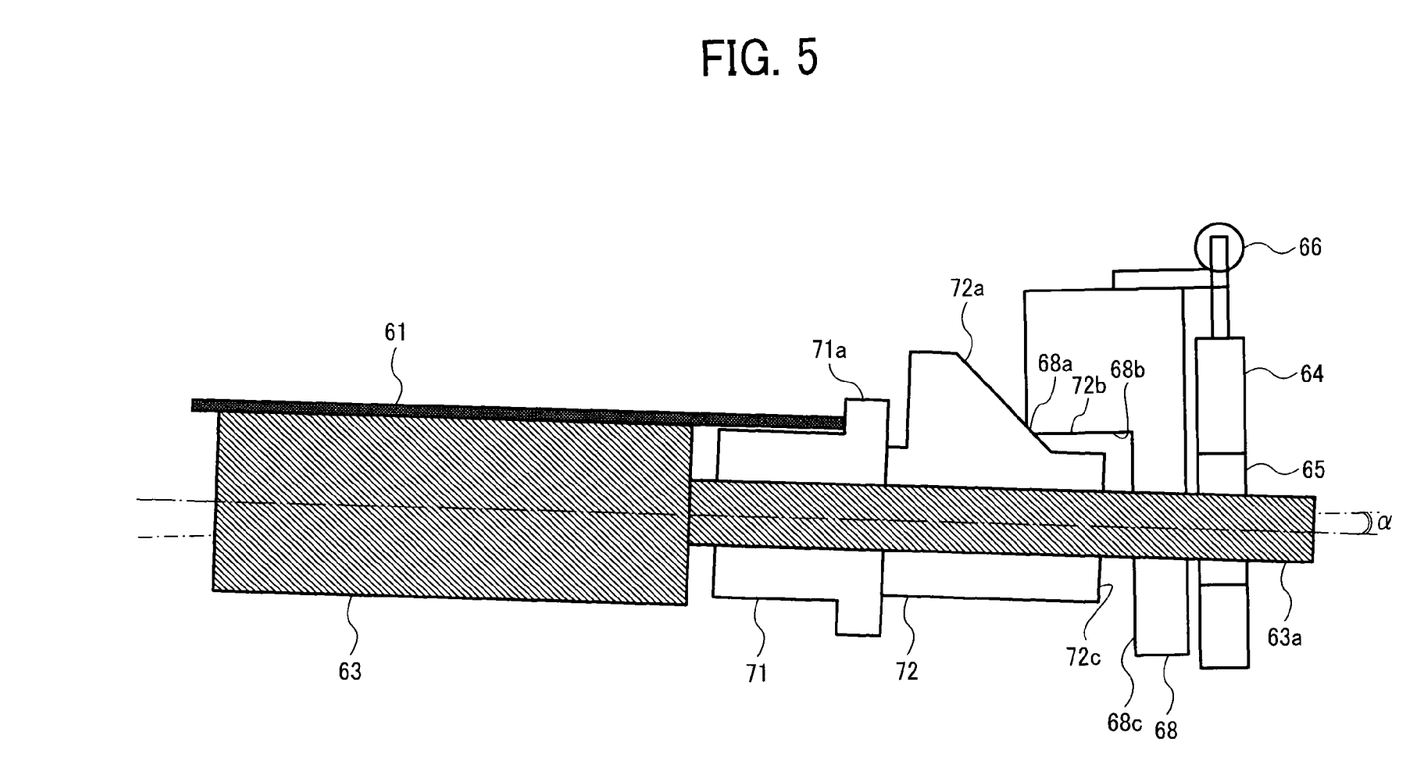
FIG. 5 is a cross-sectional diagram schematically illustrating the shaft moving device after adjustment of the belt mistracking, taken along the rotary shaft of the separation roller.

In this state, the secondary transfer belt 61 receives a force causing the secondary transfer belt 61 to move in the direction of the belt width, thereby moving the belt deviation detector 71 and the shaft inclining member 72 outward in the axial direction along the rotary shaft 63a. As a result, the contact portion 68a relatively moves along the slanted surface 72a of the shaft inclining member 72. The contact position at which the slanted surface 72a of the shaft inclining member 72 contacts the contact portion 68a of the frame 68 moves up towards the upper portion of the slanted surface 72a. As a result, the axial end portion of the rotary shaft 63a of the separation roller 63 in the moving direction of the secondary transfer belt 61 is pressed down against the biasing force of the arm spring 66 as illustrated in FIG. 5. At this time, the end portion of the secondary transfer belt 61 is not in contact with the flange 71a of the belt deviation detector 71. Accordingly, as illustrated in FIG. 4, the contact portion 68a of the frame 68 is held in a state in which the contact portion 68a of the frame 68 contacts the lower end portion of the slanted surface 72a of the shaft inclining member 72. The opposite end of the rotary shaft 63a of the separation roller 63, which is the opposite end in the moving direction of the secondary transfer belt 61, is pressed down relative to the other end, causing the rotary shaft 63a to tilt.

As the rotary shaft 63a of the separation roller 63a tilts further, the moving speed of the secondary transfer belt 61 in the direction of the belt width slows down gradually, and ultimately the secondary transfer belt 61 moves in the direction opposite to the direction of the belt width. As a result, the position of the secondary transfer belt 61 in the width direction returns gradually, thereby enabling the secondary transfer belt 61 to move reliably at a position at which the belt wander is corrected. The same is true for the case in which the direction of shift of the secondary transfer belt 61 is in the direction opposite to the direction described above.

Figure 8:
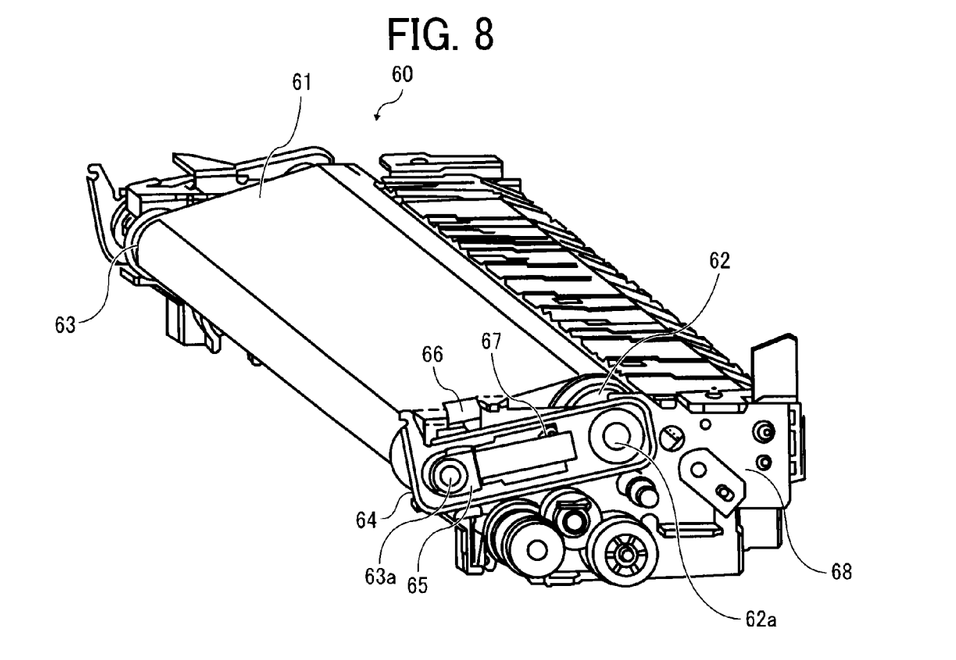
FIG. 8 is a perspective view schematically illustrating the secondary transfer device in a state (i.e., in use) in which the secondary transfer belt is stretched at a certain tension.

With reference to FIG. 8, a description is provided of a principle of correction of belt mistracking by tilting the rotary shaft 63a of the separation roller 63.

Figure 6:
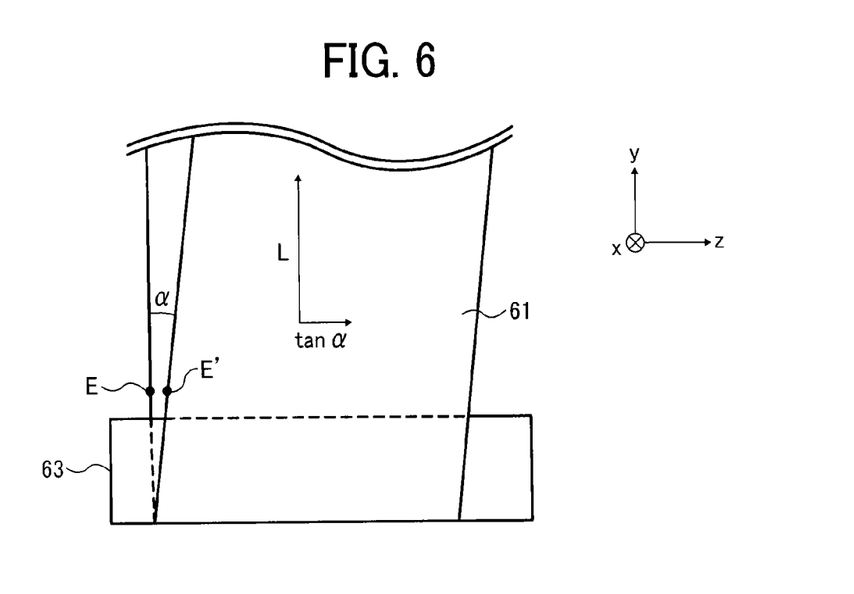
FIG. 6 is a conceptual diagram illustrating a belt skew of a secondary transfer belt.

FIG. 6 is a conceptual diagram illustrating mistracking of the secondary transfer belt 61.

Here, it is assumed that the secondary transfer belt 61 has a rigid body, and an arbitrary point (i.e., a point E on the belt end portion) on the secondary transfer belt 61 before advancing to the separation roller 63 is observed. As long as the secondary transfer belt 61 entrained about and stretched taut between two rollers, i.e., the secondary transfer roller 62 and the separation roller 63, is completely horizontal or parallel, the position of the secondary transfer belt 61 in the axial direction of the separation roller 63 does not change between the point E on the secondary transfer belt 61 immediately before entering the separation roller 63 and a point E' corresponding to the point E immediately after exiting the separation roller 63. In this case, the secondary transfer belt 61 does not travel out of alignment.

By contrast, in a case in which the rotary shaft 63a of the separation roller 63 is inclined at an inclination angle α relative to the rotary shaft 62a of the secondary transfer roller 62, the point E on the secondary transfer belt 61 shifts by an amount of tan a in the axial direction of the separation roller 63 while moving along the peripheral surface of the separation roller 63 as illustrated in FIG. 6. Therefore, by tilting the rotary shaft 63a of the separation roller 63 at the inclination angle α relative to the rotary shaft 62a of the secondary transfer roller 62, the position of the secondary transfer belt 61 in the width direction of the belt can be moved approximately by the amount of tan a in accordance with the rotation of the separation roller 63.

The amount of belt mistracking (moving speed in the width direction of the belt) of the secondary transfer belt 61 is proportional to the inclination angle α. That is, the greater is the inclination angle α, the greater is the amount of displacement of the secondary transfer belt 61. The smaller is the inclination angle α, the smaller is the amount of displacement of the secondary transfer belt 61. For example, in a case in which the secondary transfer belt 61 wanders to the right side as illustrated in FIG. 5, this belt mistracking causes the shaft inclining member 72 to move in the axial direction of the separation roller 63, thereby moving the rotary shaft 63*a* of the separation roller 63 down in FIG. 5 and thus returning the secondary transfer belt 61 to the left in FIG. 5. With this configuration, the rotary shaft 63*a* of the separation roller 63 is inclined to move the secondary transfer belt 61 in the opposite direction to the direction of the initial belt mistracking, thereby compensating the initial belt mistracking.

In other words, the secondary transfer belt 61 is moved to a place at which the initial belt mistracking and the displacement of the secondary transfer belt 61 caused by the inclination of the rotary shaft 63*a* are balanced, thereby correcting the belt mistracking. In the event in which the secondary transfer belt 61 traveling at the balanced position shifts towards either side, the inclination of the rotary shaft 63*a* of the separation roller 63 in accordance with the displacement of the belt brings the secondary transfer belt 61 to the balanced position again.

According to the present illustrative embodiment, the shaft moving device 70 of the secondary transfer device 60 tilts the rotary shaft 63*a* of the separation roller 63 at an inclination angle corresponding to the amount of displacement of the secondary transfer belt 61 in the direction of the belt width. Accordingly, displacement of the secondary transfer belt 61 is corrected fast. Furthermore, in order to tilt the rotary shaft 63*a* of the separation roller 63, the moving force of the secondary transfer belt 61 moving in the direction of the belt width is used so that an additional drive source such as a motor is not necessary and hence no space is needed to accommodate the drive source. The rotary shaft 63*a* of the separation roller 63 can be tilted with a simple configuration without a dedicated drive source.

Figure 7:
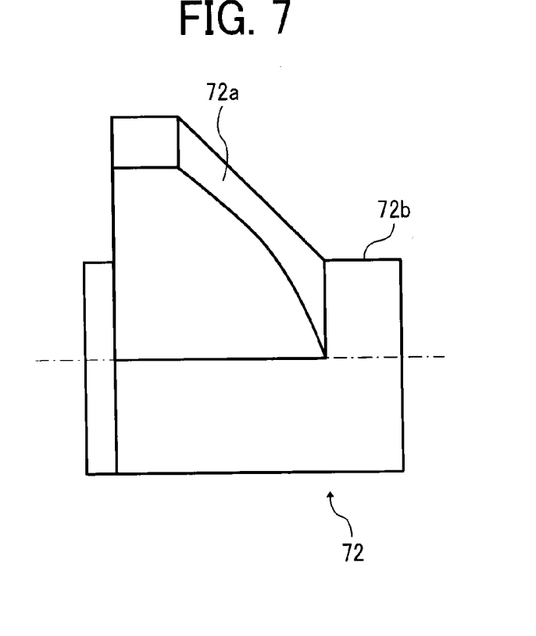
FIG. 7 is a perspective view schematically illustrating a shaft inclining member of the shaft moving device.

Next, with reference to FIG. 7, a description is provided of the shaft inclining member 72.

FIG. 7 is a perspective view schematically illustrating the shaft inclining member 72 according to an illustrative embodiment of the present disclosure.

According to the present illustrative embodiment, the shaft inclining member 72 includes a cylindrical main body, and the outer circumferential surface of the cylindrical main body includes the slanted surface 72*a*. The slanted surface 72*a* is formed of a curved surface that constitutes a part of the circumference of a conical shape, the center of which coincides with the center axis of the cylindrical main body. There are two reasons for forming the slanted surface 72*a* with a curved surface. The first reason is that even when the shaft inclining member 72 rotates slightly around the rotary shaft 63*a* of the separation roller 63, the angle of inclination of the separation roller 63 does not change. The second reason is that the curved surface of the slanted surface 72*a* allows the slanted surface 72*a* and the contact portion 68*a* of the frame 68 to make a point contact, thereby reducing friction at the contact place. With this configuration, the contact pressure at the end portion of the secondary transfer belt 61 contacting the belt deviation detector 71 is reduced, thereby reducing damage to the end portion of the secondary transfer belt 61 and hence achieving extended belt life expectancy. According to the present illustrative embodiment, the slanted surface 72*a* is tilted at an inclination angle 13 of approximately 30° relative to the rotary shaft 63*a*. Preferred material of the shaft inclining member 72 includes, but is not limited to, polyacetal (POM).

A bending stress acts repeatedly on the end portion of the secondary transfer belt 61 due to contact with the belt deviation detector 71, thus resulting in damage or breakage of the secondary transfer belt 61. For this reason, preferably, a reinforcing tape is adhered around the inner and outer circumferential surfaces at the end of the secondary transfer belt 61.

Next, a description is provided of an example of the separation roller 63 and the secondary transfer belt 61.

The diameter of the separation roller 63 is approximately φ15. The material thereof includes aluminum. The material of the secondary transfer belt 61 includes polyimide. Young's modulus of the secondary transfer belt 61 is approximately 3000 MPa. Folding endurance of the secondary transfer belt 61 measured by the MIT-type folding endurance tester is approximately 6000 times. The thickness of the secondary transfer belt 61 is approximately 80 μm. The linear velocity of the secondary transfer belt 61 is approximately 352 mm/s. The belt tension is approximately 0.9 N/cm.

It is to be noted that the folding endurance measurement by the MIT-type folding endurance tester conforms to the Japanese Industrial Standard (JIS) P8115. More specifically, the measuring conditions of the folding endurance testing performed on a sample with a width of 15 mm are as follows: Testing load: 1 kgf, Flexion angle: 135 degrees, Flexion speed 175 times per minute.

Figure 9:
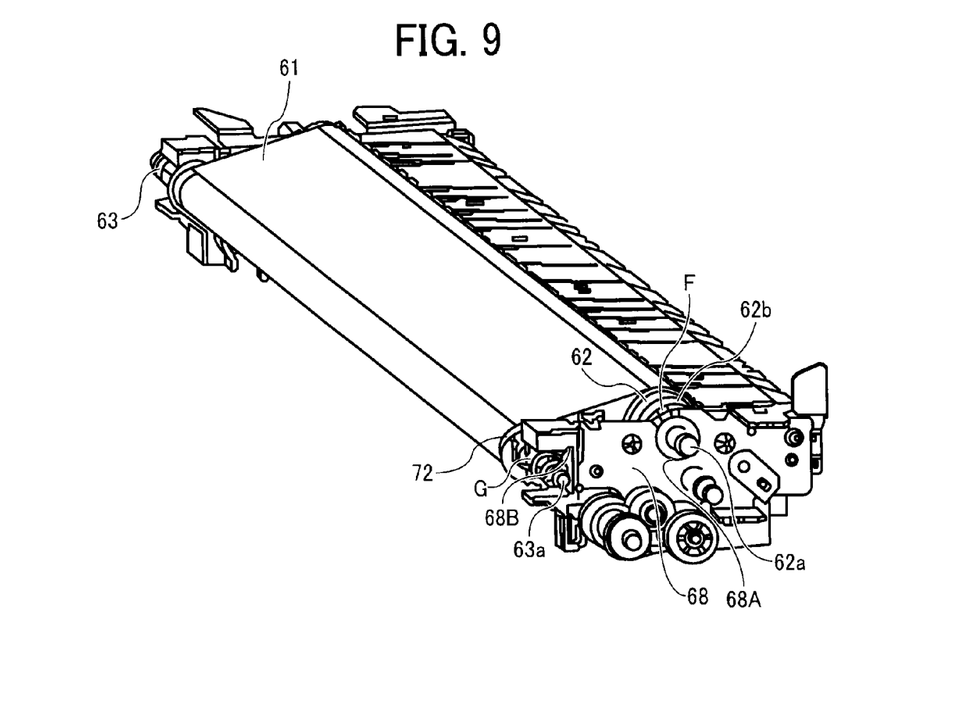
FIG. 9 is a perspective view schematically illustrating the secondary transfer device in a state (i.e., a temporary holding state) in which a shaft support arm is detached from the secondary transfer device.
Figure 10:
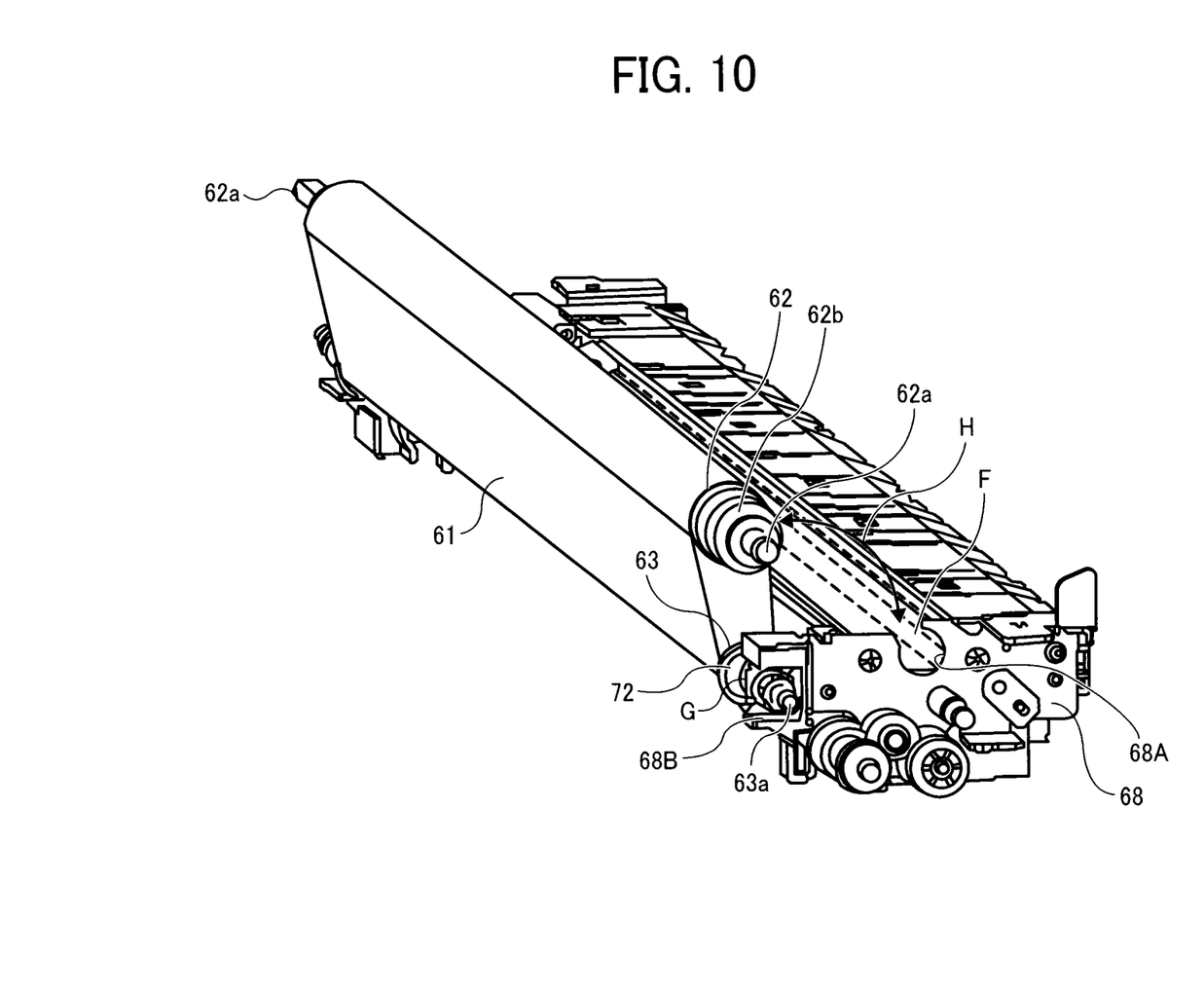
FIG. 10 is a perspective view schematically illustrating the secondary transfer device in a state (i.e., a relaxed tension state) in which a secondary transfer roller is detached from a frame.

Next, with reference to FIGS. 8 through 10, a description is provided of installation and detachment of the secondary transfer belt 61.

FIG. 8 is a perspective view schematically illustrating the secondary transfer device 60 in a state in which the secondary transfer belt 61 is stretched at a predetermined tension. In this state, the secondary transfer belt 61 is in use.

FIG. 9 is a perspective view schematically illustrating the secondary transfer device 60 in a state (i.e., a temporary holding state) in which the shaft support arm 64 with the slidable shaft bearing 65, the arm spring 66, the tension spring 67, and so forth mounted thereon is detached from the secondary transfer device 60.

FIG. 10 is a perspective view schematically illustrating the secondary transfer device 60 in a state (i.e., a relaxed tension state) in which the secondary transfer roller 62 is detached from the frame 68.

First, a description is provided of detachment operation of the secondary transfer belt 61 from the secondary transfer device 60.

As illustrated in FIG. 8, the separation roller 63 is biased by the tension spring 67 of the shaft support arm 64 in such a direction that the separation roller 63 separates from the secondary transfer roller 62. Accordingly, the secondary transfer belt 61 in use is stretched at a predetermined tension. According to the present illustrative embodiment, first, in order to reduce the tension of the secondary transfer belt 61, the shaft support arm 64 is detached from the ends of the rotary shaft 62*a* of the secondary transfer roller 62 and the rotary shaft 63*a* of the separation roller 63. Accordingly, the secondary transfer belt 61 is held temporarily in a manner as illustrated in FIG. 9.

According to the present illustrative embodiment, as illustrated in FIG. 10, the frame 68 includes a second notch 68A in a form of a C-shaped incision. The second notch 68A serves as a second retainer that detachably holds the shaft bearing 62*b* attached to the end portion of the rotary shaft 62*a* of the secondary transfer roller 62 serving as the second support roller. Furthermore, the frame 68 includes a first notch 68B which is a sidewardly open U-shaped incision that contacts the slanted surface 72*a* of the shaft inclining member 72 disposed at the end portion of the rotary shaft 63*a* of the separation roller 63 serving as the first support roller. The first notch 68B serves as a first retainer.

In the temporary holding state, as illustrated in FIG. 9, the shaft bearing 62*b* disposed at each end portion of the rotary shaft 62*a* of the secondary transfer roller 62 is held by the second notch 68A. The shaft inclining member 72 disposed at each end portion of the rotary shaft 63*a* of the separation roller 63 is held by the first notch 68B.

As illustrated in FIG. 9, the first notch 68B that holds the end portion of the rotary shaft 63*a* of the separation roller 63 includes an opening G which is sidewardly opened in a direction opposite to the secondary transfer roller 62. In the temporary holding state, the end portion of the rotary shaft 62*a* of the secondary transfer roller 62 is held by the second notch 68A, thereby restricting displacement of the secondary transfer roller 62 towards the separation roller 63. In this configuration, even when the distance between the rotary shaft 63*a* of the separation roller 63 and the rotary shaft 62*a* of the secondary transfer roller 62 needs to be increased to disengage the end portion of the rotary shaft 63*a* of the separation roller 63 from the opening G of the first notch 68B, it is difficult to obtain an enough distance that allows the end portion of the rotary shaft 63*a* of the separation roller 63 to be disengaged since the secondary transfer belt 61 is present.

By contrast, as illustrated in FIG. 9, the second notch 68A that detachably holds the end portion of the rotary shaft 62*a* of the secondary transfer roller 62 includes an opening F facing upward. More specifically, the end portion of the rotary shaft 62*a* of the secondary transfer roller 62 is inserted and detached from the opening F of the second notch 68A. With this configuration, even when the shaft support arm 64 is detached from the end portions of the rotary shafts of the secondary transfer roller 62 and the separation roller 63, the end portions of the rotary shafts of the secondary transfer roller 62 and the separation roller 63 remain held by the frame 68.

After the shaft support arm 64 is removed, that is, when the secondary transfer belt 61 is temporarily held, the end portion of the rotary shaft 62*a* of the secondary transfer roller 62 is detached from the second notch 68A of the frame 68. The opening F of the second notch 68A is formed such that in a state in which the secondary transfer roller 62 and the separation roller 63 are disposed inside the loop of the secondary transfer belt 61 the secondary transfer roller 62 is pivotally movable about the rotary shaft 63*a* of the separation roller 63 held by the frame 68 in directions indicated by a double-headed arrow E in FIG. 10, thereby allowing the end portion of the rotary shaft 62*a* of the secondary transfer roller 62 to be detachably attachable relative to the second notch 68A. As illustrated in FIG. 10, as the secondary transfer roller 62 temporarily held is pivotally moved about the rotary shaft 63*a* of the separation roller 63, the end portion of the rotary shaft 62*a* of the secondary transfer roller 62 can be detached from the second notch 68A of the frame 68.

When the end portion of the rotary shaft 62*a* of the secondary transfer roller 62 is detached from the second notch 68A of the frame 68, the secondary transfer roller 62 can move freely. As a result, the distance between the rotary shaft 62*a* of the secondary transfer roller 62 and the rotary shaft 63*a* of the separation roller 63 can be shortened, hence allowing the end portion of the rotary shaft 63*a* of the separation roller 63 to be detached from the opening G. After the end portion of the rotary shaft 63*a* of the separation roller 63 is detached from the first notch 68B, the secondary transfer belt 61 can be drawn out and detached from the secondary transfer roller 62 and the separation roller 63 in the axial direction of the rotary shafts of the secondary transfer roller 62 and the separation roller 63.

Next, a description is provided of installation of the secondary transfer belt 61 in the secondary transfer device 60.

Basically, the secondary transfer belt 61 is installed in the secondary transfer device 60 in reverse order as to when the secondary transfer belt 61 is detached therefrom. More specifically, the secondary transfer roller 62 and the separation roller 63 are inserted inside the looped the secondary transfer belt 61, that is, at the inner circumferential side of the secondary transfer belt 61. Subsequently, the end portion of the rotary shaft 63*a* of the separation roller 63 is inserted from the opening G to the first notch 68B of the frame 68 of the secondary transfer device 60 as illustrated in FIG. 10. Subsequently, the end portion of the rotary shaft 62*a* of the secondary transfer roller 62 is pivotally moved about the separation roller 63 held by the frame 68 to the second notch 68A of the frame 68 while pulling the end portion of the rotary shaft 62*a* of the secondary transfer roller 62 such that the secondary transfer belt 61 is tensioned lightly. With this configuration, the end portion of the rotary shaft 62*a* of the secondary transfer roller 62 is inserted from the opening F of the frame 68 to the second notch 68A, and the rotary shaft 62*a* of the secondary transfer roller 62 is held temporarily in a manner shown in FIG. 9.

Subsequently, the shaft support arm 64 is attached to the end portion of the rotary shafts of the secondary transfer roller 62 and the separation roller 63. Accordingly, as illustrated in FIG. 8, the tension spring 67 of the shaft support arm 64 biases the separation roller 63 in such a direction that the separation roller 63 separates from the secondary transfer roller 62, thereby stretching the secondary transfer belt 61 at a predetermined tension. Accordingly, the secondary transfer belt 61 is stretched taut and becomes operable or in use.

According to the present illustrative embodiment of the present disclosure, the end portion of the rotary shaft 63*a* of the separation roller 63 is held by three planes of the first notch 68B which is a sidewardly open U-shaped incision serving as the first retainer. However, the configuration to hold the end portion of the rotary shaft 63*a* of the separation roller 63 is not limited to this. As long as there are at least two planes to support the rotary shaft 63*a*, the rotary shaft 63*a* of the separation roller 63 can be assembled although assemblage is degraded slightly.

A description has been provided of an example of applying the conveyor system of the illustrative embodiment to the secondary transfer device 60. Similarly, the present disclosure can be applied to a belt assembly including an endless looped belt such as the intermediate transfer belt 51 and so forth is employed.

According to the present illustrative embodiment, the belt assembly includes the belt alignment device. The present disclosure can be applied to the belt assembly without the belt alignment device.

The above-described image forming apparatus is an example of the image forming apparatus of the present invention. The present invention includes the following embodiments.

(Aspect A)

The belt assembly includes a belt such as the secondary transfer belt 61, a plurality of support rollers such as the secondary transfer roller 62 and the separation roller 63, and a shaft-end retainer such as the frame 68. The belt is formed into an endless loop. The belt is entrained about and stretched taut between the plurality of support rollers with a rotary shaft. The plurality of support rollers includes a first support roller such as the separation roller 63 and a second support roller such as the secondary transfer roller 62. The shaft-end retainer is disposed at each end of the rotary shaft of the plurality of support rollers and includes a first retainer such as the first notch 68B and a second retainer such as the second notch 68A. The first retainer detachably holds an end of the rotary shaft of the first support roller. The second retainer detachably holds an end of the rotary shaft of the second support roller and includes a second-retainer opening such as the opening F from which the end of the rotary shaft of the second roller is detached from and attached to the second retainer in a direction perpendicular to the rotary shaft of the second support roller.

According to the aspect of the disclosure, when detaching the belt, the end portion of the rotary shaft of the second support roller is detached from the opening of the second retainer, thereby allowing the second support roller to move freely. With this configuration, a distance between the shaft of the first support roller and the shaft of the second support roller can be shortened so that the tension of the belt can be loosened. Subsequently, the first support roller is detached from the first retainer, thereby allowing the belt to be pulled out from the first support roller and the second roller in the axial direction thereof. The belt can be removed from these support rollers.

According to the aspect of the disclosure, the tension of the belt can be reduced without designated parts such as a pivot mechanism and a lock to the shaft-end retainer provided to the shaft retainer. Furthermore, according to the aspect of the disclosure, the tension of the belt can be reduced by a simple configuration in which the second retainer to hold the end portion of the rotary shaft of the second support roller includes the opening. No additional part is necessary. Therefore, the endless looped belt can be detached from and attached to the rollers with a simple configuration having a small number of parts.

(Aspect B)

According to Aspect A, the second-retainer opening is formed such that the end portion of the rotary shaft of the second support roller can be detachably attachable from the opening by rotating pivotally the second support roller about the first support roller held by the first retainer.

With this configuration, the end portion of the rotary shaft of the second support roller can be detached from the opening of the second retainer without pulling the belt in a direction causing the tension of the belt to increase. Thus, even when the first support roller and the second support roller are supported by the shaft-end retainer and the belt is stretched at a relatively high tension, the end portion of the rotary shaft of the second support roller can be detached easily from the opening of the second retainer.

(Aspect C)

According to Aspect A or Aspect B, the first retainer includes a first-retainer opening such as the opening G. The end portion of the rotary shaft of the first support roller needs to be detached from and attached to the rotary shaft of the first support roller. The first-retainer opening faces an opposite side to the second support roller held by the second retainer.

With this configuration when the second support roller is pivotally moved about the first support roller held by the first retainer, the end portion of the rotary shaft of the first support roller is prevented from disengaged from the first retainer, hence facilitating installation of the belt.

(Aspect D)

According to any one of Aspects A through C, the belt assembly includes a belt alignment device such as the shaft moving device 70. One of the first support roller or the second support roller is tiltable. The belt alignment device tilts the rotary shaft of the first support roller or the rotary shaft 63a of the second support roller such as the separation roller 63, whichever is tiltable, to restrict displacement of the belt in a width direction of the belt to a predetermined permissible range. The belt alignment device is disposed at the shaft end portion of the tiltable support roller, and includes an axial displacement device such as the belt deviation detector 71 and the shaft inclining member 72 that moves along the rotary shaft of the tiltable roller to one end of the rotary shaft in the width direction of the belt as the belt receives a force causing the belt to move in the width direction of the belt and a fixation member such as the frame 68 to contact the axial displacement device from the one end in the width direction of the belt. At least one of the axial displacement device and the fixation member includes a slanted surface that contacts another of the axial displacement device and the fixation member, and as the belt receives the force causing the belt to move in the width direction of the belt and the axial displacement device moves along the slanted surface relative to the fixation member, thereby changing a position of the shaft end portion of the tiltable roller, the rotary shaft of the tiltable roller tilts. A portion of the shaft-end retainer constitutes the fixation member.

With this configuration, belt mistracking can be prevented with a simple configuration.

(Aspect E)

An image forming apparatus employs the belt assembly of any one of Aspects A through D. The belt assembly includes an endless looped belt that carries on its outer circumferential surface a sheet-type medium such as a recording medium on which an image is formed or recorded.

With this configuration, the endless loop belt can be detached from and installed in the belt assembly with a simple configuration having a small number of parts.

(Aspect F)

According to Aspect E, the image forming apparatus includes a primary transfer device such as the primary transfer rollers 11a, 11b, 11c, and 11d to primarily transfer the image formed on a latent image bearing member such as the photosensitive members 1a, 1b, 1c, and 1d onto the intermediate transfer member; and a secondary transfer device such as the secondary transfer device 60 to secondarily transfer the image on the intermediate transfer member onto the sheet-type medium carried on the outer circumferential surface of the belt.

With this configuration, the belt of the secondary transfer device can be detached and attached with a simple configuration having a small number of parts.

According to an aspect of this disclosure, the present invention is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A belt assembly, comprising:

a frame;

a tiltable roller with a rotary shaft, wherein the frame has a first space shaped to receive one end of the rotary shaft of the tiltable roller;

a support roller with a rotary shaft, wherein the frame has a second space shaped to receive the rotary shaft of the support roller;

a belt extending around the tiltable roller and the support roller, the belt being formed into an endless loop, wherein the support roller is able to be received in the second space of the frame by pivotally moving the support roller about the one end of the rotary shaft of the tiltable roller as a rotational axis, while keeping the belt taut; and an axial displacement device disposed at the one end of the rotary shaft of the tiltable roller, and able to contact the belt to move the belt along the rotary shaft of the tiltable roller in a width direction of the belt as the belt receives a force causing the belt to move in the width direction of the belt, wherein the axial displacement device causes the rotary shaft of the tiltable roller to tilt and to change the position of the one end of the rotary shaft of the tiltable roller, wherein the second space of the frame is shaped to receive the one end of the rotary shaft of the support roller while taking into account the changeable position of the one end of the rotary shaft of the tiltable roller.

2. The belt assembly according to claim 1, wherein the first space extends in a direction perpendicular to the rotary shaft of the tiltable roller, and opens in a direction opposite to the second space.

3. An image forming apparatus, comprising a belt assembly, the belt assembly including:

a frame;

a tiltable roller with a rotary shaft, wherein the frame has a first space shaped to receive one end of the rotary shaft of the tiltable roller;

a support roller with a rotary shaft, wherein the frame has a second space shaped to receive the rotary shaft of the support roller;

a belt extending around the tiltable roller and the support roller, the belt being formed into an endless loop, wherein the support roller is able to be received in the second space of the frame by pivotally moving the support roller about the one end of the rotary shaft of the tiltable roller as a rotational axis, while keeping the belt taut; and an axial displacement device disposed at the one end of the rotary shaft of the tiltable roller, and able to contact the belt to move the belt along the rotary shaft of the tiltable roller in a width direction of the belt as the belt receives a force causing the belt to move in the width direction of the belt, wherein the axial displacement device causes the rotary shaft of the tiltable roller to tilt and to change the position of the one end of the rotary shaft of the tiltable roller, wherein the second space of the frame is shaped to receive the one end of the rotary shaft of the support roller while taking into account the changeable position of the one end of the rotary shaft of the tiltable roller.

4. The image forming apparatus according to claim 3, further comprising:

a latent image bearing member to bear an image on a surface thereof;

an intermediate transfer member onto which the image is transferred from the latent image bearing member;

a primary transfer device to primarily transfer the image formed on the latent image bearing member onto the intermediate transfer member; and a secondary transfer device to secondarily transfer the image on the intermediate transfer member onto a sheet-type medium carried on an outer circumferential surface of the belt of the belt assembly.

5. The image forming apparatus according to claim 3, wherein the first space extends in a direction perpendicular to the rotary shaft of the tiltable roller, and opens in a direction opposite the second space.

* * * * *